United States Patent
Stroszynski

[15] 3,660,190
[45] May 2, 1972

[54] PROCESS FOR THE MANUFACTURE OF A COMPOSITE MATERIAL HAVING A METAL LAYER

[72] Inventor: Joachim Stroszynski, Wiesbaden, Germany

[73] Assignee: Kalle Aktiengesellschaft, Wiesbaden-Biebrich, Germany

[22] Filed: Dec. 27, 1968

[21] Appl. No.: 787,438

[30] Foreign Application Priority Data

Dec. 30, 1967  Germany.....................P 17 04 785.7

[52] U.S. Cl..............................156/150, 156/231, 156/233, 156/241, 156/249, 156/272, 156/309
[51] Int. Cl. ........................................................C23b 5/00
[58] Field of Search..................156/272, 309, 150, 324, 249, 156/231, 233, 241; 117/107.1

[56] References Cited

UNITED STATES PATENTS

| | | | |
|---|---|---|---|
| 2,996,418 | 8/1961 | Bleil | 156/233 X |
| 3,043,728 | 7/1962 | Stauffer | 156/233 X |
| 3,306,798 | 2/1967 | Gaenge | 156/233 X |
| 3,414,489 | 12/1968 | Rogers | 156/151 X |
| 3,497,417 | 2/1970 | Rizzo | 156/151 X |

Primary Examiner—Carl D. Quarforth
Assistant Examiner—Stephen J. Lechert, Jr.
Attorney—James E. Bryon

[57] ABSTRACT

This invention relates to a process for the manufacture of a composite material including a supporting film or foil and a metal layer bonded thereto, which comprises depositing the metal layer on an intermediate support having an endless rotatable surface, pressing the supporting film or foil onto the metal layer while an adhesive layer is interposed between them and while the film or foil is supported by a cylindrical conveyor roller, and removing the bonded composite material from the surface of the latter roller.

6 Claims, 2 Drawing Figures

PATENTED MAY 2 1972 3,660,190

INVENTOR
JOACHIM STROSZYNSKI

BY
Bryan and Butrum
ATTORNEYS

PROCESS FOR THE MANUFACTURE OF A COMPOSITE MATERIAL HAVING A METAL LAYER

This invention relates to a process for the manufacture of a composite material comprising a supporting film or foil and a metal layer bonded thereto.

It is known to apply a thin metal layer to a support by electrodeposition or vapor deposition in vacuo. It is also known to transfer a metal layer deposited in this manner from a support on which it has been deposited to a supporting film or foil, e.g. of plastic material, paper or metal, by bonding the film or foil with the metal layer on the support and stripping the metal layer from the support together with the supporting film or foil bonded thereto. The process can be performed with relatively thin metal layers, but it cannot be safely performed with a metal layer thinner than 0.007 mm. and it hitherto has not been possible to perform it continuously with sufficiently thick metal layers.

The present invention provides a process for the continuous manufacture of a composite material the metal layer of which may have a thickness of 0.001 mm., for example.

The process is a further development of the known process for the manufacture of a composite material from a supporting film or foil and a metal layer bonded thereto, wherein the latter is applied to the surface of an intermediate support by electrodeposition or vapor deposition and then, on the intermediate support, bonded to the supporting film or foil by means of an adhesive layer and then drawn off with the film or foil from the surface of the intermediate support. An intermediate support is used which has an endless rotating surface, the metal layer is continuously deposited thereon, a cylindrical conveyor is rotated, the supporting film or foil is conveyed on the surface of this roller to the deposited metal layer, the supporting film or foil is pressed onto the metal layer by means of the conveyor roller, while applying the adhesive layer between them, and the supporting film or foil thus bonded with the metal layer remains on the roller surface of the conveyor when it is conveyed from the gap between the surface of the intermediate support and the conveyor roller.

An endless rotating intermediate support is used in this process. It is, for example, the surface of a roller. Another example of an endless rotating intermediate support is an endless belt which passes around two or more guide rollers. When the metal layer must be electrodeposited, the belt is an electroconducting belt. By means of several guide rollers such a belt can be passed through two or more galvanic baths so that the deposited metal layer may include two or more metals. Also, when the metal layer is applied by vapor deposition in vacuo the layer may include more than one metal. When the metal layer consists of only one electrodeposited metal, the intermediate support may be a roller which advantageously is horizontally mounted and partially immersed into the galvanic bath.

The metal layer deposited on the intermediate support may adhere thereto less firmly than to the adhesive used in the process. A vapor deposited metal layer, generally, has only a poor adhesion to the surface onto which it has been deposited. The adhesion of an electro deposited metal layer to the intermediate support depends on the surface characteristics thereof, i.e. on the metal of which its surface consists and on the composition of the surface. It is known in electroplating which type of surface must be selected for the cathode in order to obtain a metal deposit thereon which can be easily stripped therefrom. It is known, for example, that a polished chrome surface is suitable for the deposition of a strippable copper or nickel layer and a smooth copper cathode is suitable for the deposition of a strippable iron layer. On the other hand, numerous adhesives are known with which metal layers can be firmly bonded to supporting films or foils of any type. The selection of the surface of the intermediate support and of the adhesive is no part of the present invention.

The process uses a cylindrical conveyor. It serves for conveying the supporting film or foil, for applying contact pressure when the supporting film or foil is bonded to the deposited metal layer, and for conveying away the bonded composite material, comprising the supporting film or foil and the metal layer, from the surface of the intermediate support. The conveyor roller is rotated at a speed such that the outer surface of the supporting film or foil thereon is moved at the same speed and, at the point where it is pressed onto the metal layer, in the same direction.

Before the supporting film or foil is pressed onto the metal layer, the adhesive is applied to the surface of the metal layer to be bonded or to the surface of the supporting film or foil or to both surfaces to be bonded.

The process will be further illustrated by reference to the accompanying drawings in which:

FIG. 1 shows an embodiment in which the adhesive is applied to the surface of the supporting film or foil, and FIG. 2 shows an embodiment in which the adhesive is applied to the surface of the metal layer.

Both FIGS. are diagrammatic showings in which the thicknesses of the individual layers are considerably enlarged for the purpose of better illustration.

Figure 1:
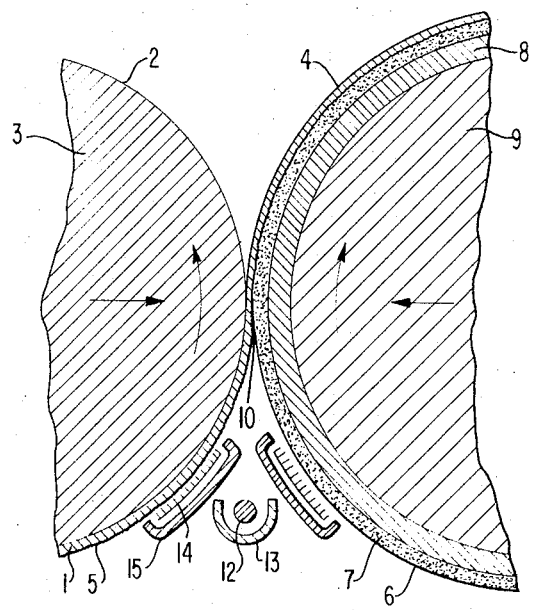
FIGS. 1 and 2 show that part of the process in which bonding of the supporting film or foil to the metal layer and stripping of the metal layer from the intermediate support are performed.
Figure 2:
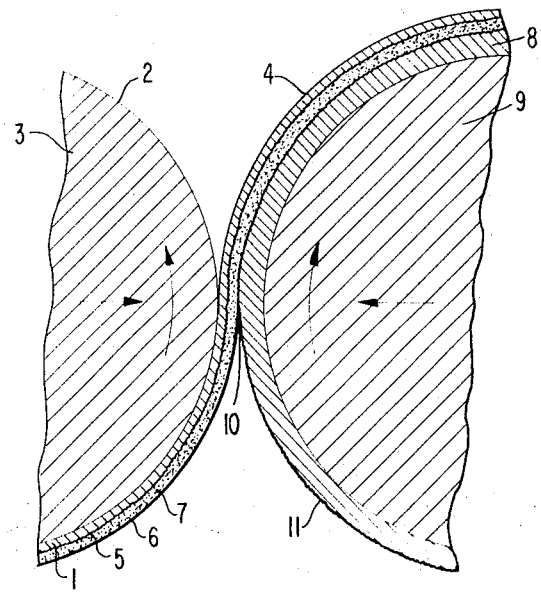

In a known manner not shown in FIGS. 1 and 2, a copper layer 1 is continuously electrodeposited on the chrome-plated, smooth, extra-bright surface 2 of the rotatable roller 3. The surface 4 of the copper layer facing the roller surface 2 is given a surface smoothness by electrodeposition which is conformable to the polished surface 2. The copper layer 1 first adheres to the roller surface 2.

The other surface 5 of the copper layer, which may be oxidized by the action of air or by an oxidation treatment, for example, exhibits a certain roughness.

The surface of the second roller 9 mounted beside the first-mentioned roller 3 and having an axis parallel to the axis of the latter carries a supporting film or foil 8 which is pressed against the metal layer 1 on the roller 3 by means of the roller 9. The roller 9 and the roller 3 are rotated at speeds such that the supporting film or foil 8 has the same linear speed as the metal layer 1. The direction of rotation of both rollers 3 and 9 is indicated by the arrows.

An adhesive layer 7 is applied between the metal layer 1 and the supporting film or foil 8. In the embodiment of the process illustrated in FIG. 1, it is applied to the supporting film or foil 8 so that, at point 10 at which bonding of the supporting film or foil 8 on the roller 9 with metal layer 1 is performed, the outer surface 6 of the adhesive layer 7 is pressed onto the outer surface 5 of the metal layer. In the embodiment of the process illustrated in FIG. 2, the adhesive layer 7 is applied to the metal layer 1 so that, at point 10 at which bonding of the supporting film or foil 8 on the roller 9 with the metal layer 1 is performed, the outer surface 6 of the adhesive layer 7 is pressed onto the outer surface 11 of the supporting film or foil 8.

The application of the adhesive from which the adhesive layer 7 is formed is known and thus is not illustrated in the drawings. Generally, the adhesive layer 7 comprises a coated adhesive which has been dried to a certain extent. To increase the adhesive strength between the supporting film or foil 8 and the adhesive layer 7, it is sometimes advantageous to roughen the supporting film or foil 8 on the surface 11 which is covered with the adhesive layer 7, e.g. by brushing or sand blasting.

The bonding between the metal layer 1 and the adhesive layer 7 may be accelerated by conventional means. It is thus possible to position a bar-shaped heat radiator 12 between both rollers adjacent the point 10 and to direct the heat rays emitted therefrom toward point 10 by means of the heat-ray reflector 13. To increase the bonding strength, it also is possible to treat the surface 5 of the metal layer 1 in known manner. For this purpose, the surface 5 may be exposed to the action of a corona discharge emitted from an electrode 14 surrounded by a protective casing 15. A similar treatment also may be performed on the surface 6 of the adhesive layer 7 or on the surface 11 of the supporting film or foil 8.

The roller 3 partially shown in FIGS. 1 and 2 is an intermediate support to be used in the process, one surface of which, i.e., the roller surface 2 is an endless rotating surface.

Instead of the roller 3, an endless belt may be used as the intermediate support, which belt passes around a system of two or more rollers one of which serves as an abutment when pressing the supporting film or foil 8, by means of the conveyor roller 9, against a metal layer deposited on the endless belt.

The process described by reference to FIGS. 1 and 2 may be employed in a corresponding manner when the metal layer is vapor deposited in vacuo on the intermediate support.

The process has the advantage that it permits the continuous manufacture of a composite material by combining a thin metal layer with a supporting film or foil. The metal layer may have a thickness of 0.001 mm., for example. Another advantage is that the process permits the production of a very thin smooth metal layer of very uniform thickness in combination with a supporting film or foil.

In accordance with the invention, the process may be employed for bilateral coating in which both sides of the supporting film or foil are successively coated.

It will be obvious to those skilled in the art that many modifications may be made within the scope of the present invention without departing from the spirit thereof, and the invention includes all such modifications.

What is claimed is:

1. A process for the manufacture of a composite material including a supporting film or foil and a metal layer bonded thereto, which comprises depositing the metal layer on an intermediate support having an endless rotatable surface, pressing and thereby bonding the supporting film or foil onto the metal layer while an adhesive layer coated on at least one of the mating surfaces is interposed between them and while the film or foil is supported by a cylindrical conveyor roller, and removing the bonded composite material from the surface of the intermediate support.

2. A process according to claim 1 in which the metal layer is deposited on the intermediate support by electrodeposition or vapor deposition.

3. A process according to claim 1 in which the supporting film or foil is pressed onto the metal layer while heat is applied.

4. A process according to claim 1 in which the surface of the metal layer to be bonded is subjected to a corona discharge before bonding.

5. A process according to claim 1 in which the surface of the supporting film or foil is subjected to a corona discharge before bonding.

6. A process according to claim 1 in which the surface of the adhesive layer is subjected to a corona discharge before bonding.

* * * * *